US010791343B2

(12) United States Patent
Alakuijala et al.

(10) Patent No.: US 10,791,343 B2
(45) Date of Patent: Sep. 29, 2020

(54) MIXED NOISE AND FINE TEXTURE SYNTHESIS IN LOSSY IMAGE COMPRESSION

(71) Applicant: Google LLC, Mountain View, CA (US)

(72) Inventors: Jyrki Antero Alakuijala, Wollerau (CH); Jan Wassenberg, Langnau am Albis (CH)

(73) Assignee: Google LLC, Mountain View, CA (US)

( * ) Notice: Subject to any disclaimer, the term of this patent is extended or adjusted under 35 U.S.C. 154(b) by 235 days.

(21) Appl. No.: 15/920,052

(22) Filed: Mar. 13, 2018

(65) Prior Publication Data

US 2019/0289330 A1    Sep. 19, 2019

(51) Int. Cl.
| H04N 19/85 | (2014.01) |
| G06T 7/40 | (2017.01) |
| G06T 7/90 | (2017.01) |
| H04N 19/44 | (2014.01) |
| H04N 19/61 | (2014.01) |
| H04N 19/17 | (2014.01) |
| H04N 19/27 | (2014.01) |

(52) U.S. Cl.
CPC ............... *H04N 19/85* (2014.11); *G06T 7/40* (2013.01); *G06T 7/90* (2017.01); *H04N 19/17* (2014.11); *H04N 19/27* (2014.11); *H04N 19/44* (2014.11); *H04N 19/61* (2014.11)

(58) Field of Classification Search
CPC ........ H04N 19/85; H04N 19/27; H04N 19/17; H04N 19/44; G06T 7/90
See application file for complete search history.

(56) References Cited

U.S. PATENT DOCUMENTS

| 5,872,867 | A  * | 2/1999  | Bergen  | G06T 11/001 |
| | | | | 382/254 |
| 6,751,339 | B1 * | 6/2004  | Windle  | G06T 11/001 |
| | | | | 345/582 |
| 6,762,769 | B2 * | 7/2004  | Guo     | G06T 11/001 |
| | | | | 345/582 |
| 6,977,659 | B2 * | 12/2005 | Dumitras | G06T 7/40 |
| | | | | 345/582 |

(Continued)

FOREIGN PATENT DOCUMENTS

WO    2004105250 A2    12/2004

OTHER PUBLICATIONS

Richard Lyons, Windowing Functions Improve FFT Results, Part I, Jun. 1, 1998, pp. 14 (Year: 1998).*

(Continued)

*Primary Examiner* — Mekonen T Bekele
(74) *Attorney, Agent, or Firm* — Brake Hughes Bellermann LLP

(57) ABSTRACT

An encoder and/or a computer implemented encoding method includes a texture module configured to determine texture data associated with texture of an image, a noise module configured to determine noise data based on the texture data, a synthesis module configured to generate spatial spectral characteristics of the noise, and combine at least one of the noise data, the texture data, and the spatial spectral characteristics of the noise based on at least one border between adjacent textures, and an encoding module configured to compress the image using an image compression codec.

20 Claims, 9 Drawing Sheets

(56) References Cited

U.S. PATENT DOCUMENTS

| | | | | |
|---|---|---|---|---|
| 7,606,435 | B1* | 10/2009 | Dumitras | G06T 11/001 382/243 |
| 8,068,117 | B2* | 11/2011 | Lefebvre | G06T 11/001 345/582 |
| 2003/0190056 | A1* | 10/2003 | Metois | G06T 9/001 382/100 |
| 2010/0046845 | A1 | 2/2010 | Wedi et al. | |
| 2017/0249014 | A1* | 8/2017 | Meyer | G06F 3/0488 |
| 2019/0320173 | A1* | 10/2019 | Alakuijala | H04N 19/124 |

OTHER PUBLICATIONS

Adriana Dumitras et al.,"A Texture Replacement Method at the Encoder for Bit-Rate Reduction of Compressed Video"; EEE Transactions on Circuits and Systems for Video Technology, vol. 13, No. 2, Feb. 2003, p. 163-175 (Year: 2003).*

Dumitras, et al., "A texture replacement method at the encoder for bit-rate reduction of compressed video", IEEE Transactions on Circuits and Systems for Video, vol. 13, No. 2, pp. 163-175, Feb. 2003, XP055313160.

International Search Report and Written Opinion for International Application No. PCT/US2019/021769, dated Jun. 14, 2019, 19 pages.

Portilla, et al., "A Parametric Texture Model Based on Joint Statistics of Complex Wavelet Coefficients", International Journal of Computer Vision, vol. 40, No. 1, pp. 49-71, Oct. 2000, XP002473477.

\* cited by examiner

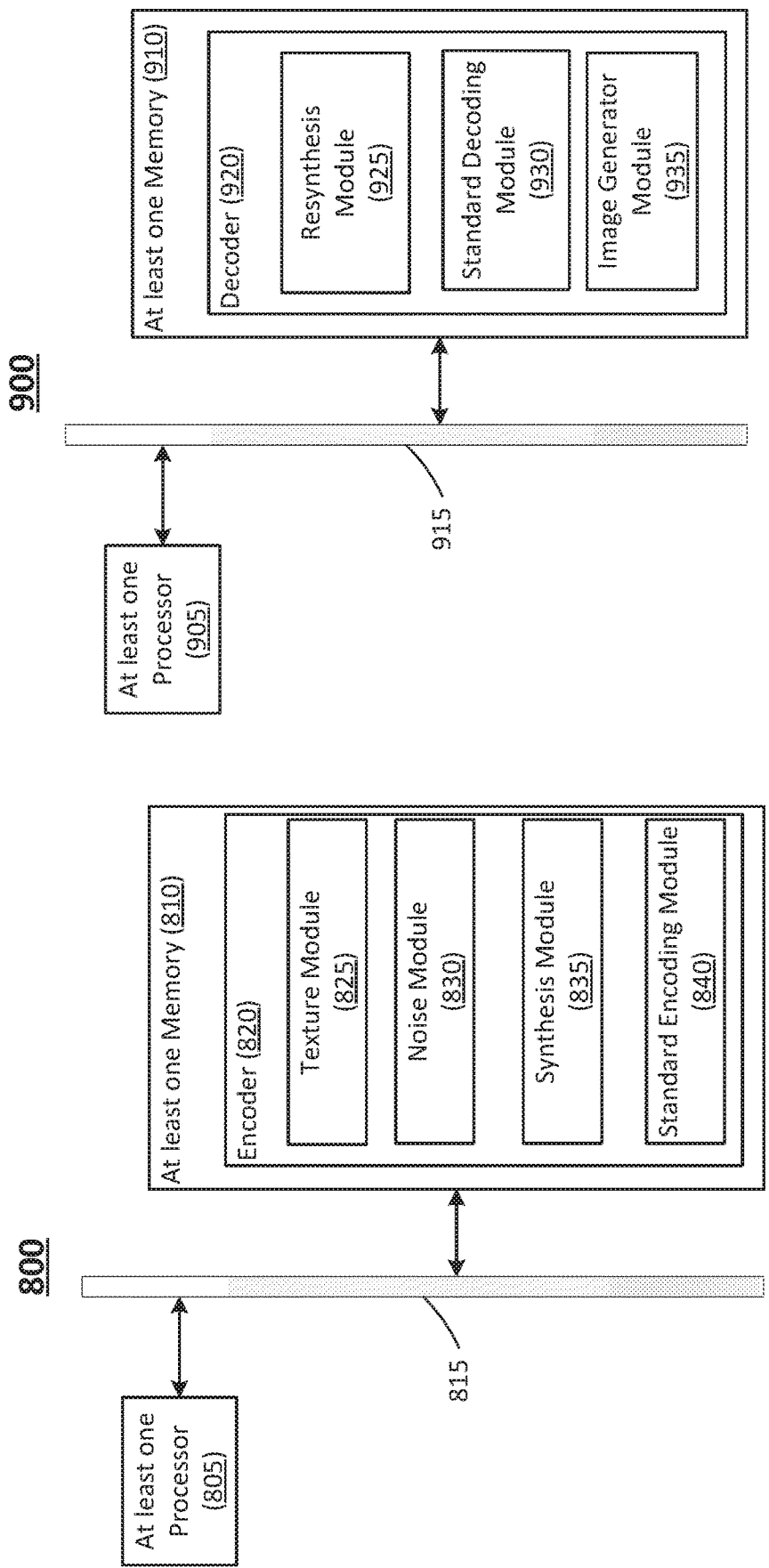

MIXED NOISE AND FINE TEXTURE SYNTHESIS IN LOSSY IMAGE COMPRESSION

FIELD

Implementations relate to maintaining texture information in a compressed (e.g., encoded) image.

BACKGROUND

Images (e.g., photographs) typically contain sensor noise associated with the device that captures the image. While storing the image, a conventional lossy image compression technique can be used to reduce the size of data associated with the image. Using these compression techniques, the noise can be removed and the image can be stored as a noiseless image. Otherwise, a relatively large amount of memory is used to store some representation of the noise. The representations of noise that are available can be primitive in image formats, even though the noise itself can be a large amount of information. Furthermore, in some cases more than 50% of the information content in the image can be noise. Removing the noise can also cause the removal some fine textures (e.g., that are desirable to keep in the image).

SUMMARY

In a general aspect, an encoder and/or a computer implemented encoding method includes a texture module configured to determine texture data associated with texture of an image, a noise module configured to determine noise data based on the texture data, a synthesis module configured to generate spatial spectral characteristics of the noise, and combine at least one of the noise data, the texture data, and the spatial spectral characteristics of the noise based on at least one border between adjacent textures, and an encoding module configured to compress the image using an image compression codec.

Implementations can include one or more of the following features. For example, the texture module can separate the image into texture data and color data, the texture data being at least one of a pixel color variation as compared to surrounding pixels and a pixel intensity variation as compared to surrounding pixels, and the encoder can be configured to compress the color data. The texture data can be noise that is filtered from the image. The image can include a plurality of layers, and the texture data can be included in one of the plurality of layers. The noise data can be calculated as noise representing texture, and a windowed FFT can be applied to the noise data to generate the spatial spectral characteristics of the noise. The synthesis module can be configured to determine high frequency noise as noise data above a threshold value, cluster the high frequency noise meeting a condition into radially symmetric clusters, and assign each cluster at least one of a scalar value and a direction value. The noise data can be at least one of noise, a noise vector, an algorithm configured to generate noise, and an algorithm configured to generate a noise vector.

In another general aspect, a method includes receiving an image, removing noise data from the image, determining spatial spectral characteristics of the noise, modeling the spatial spectral characteristics of the noise, clustering the modeled spatial spectral characteristics of the noise into radially symmetric clusters, and generating a file including the noise data and the radially symmetric clusters based on at least one border between adjacent textures.

Implementations can include one or more of the following features. For example, the method can further include applying a windowed FFT to the noise data to generate the spatial spectral characteristics of the noise. The method can further include defining spatial patterns based on the radially symmetric clusters, wherein the spatial patterns represent objects associated with the image. Removing the noise can include filtering at least one of a pixel color variation as compared to surrounding pixels and a pixel intensity variation as compared to surrounding pixels from the image.

In yet another general aspect, an encoder and/or a computer implemented encoding method includes a re-synthesis module configured to receive mixed noise data and synthesized texture data associated with a compressed image, the mixed noise data and synthesized texture data including noise data and synthesized texture data corresponding to pixel data that is structured based on at least one border between adjacent textures, and generate texture data from the mixed noise data and synthesized texture data, a decoder module configured to decompress the compressed image using an image decompression codec, and an image generator module configured to generate an image by adding the texture data to the decompressed image.

Implementations can include one or more of the following features. For example, the image generator module can add the texture data to the decompressed image pixel-by-pixel. The image generator module adds the texture data to the decompressed image as an image layer. The image may not have texture characteristics on each pixel that are the same as an original image. The noise can be clustered into radially symmetric clusters, each cluster can be assigned at least one of a scalar value and a direction value, and the noise can be calculated using a weighted algorithm where each scalar value is weighted.

The noise can be clustered into four radially symmetric clusters, each cluster can be assigned a scalar value and a direction value, and the noise for each pixel is calculated as total=w0*noise-up-left+w1*noise-up+w2*noise-up-right+w3*noise-right, where w0, w1, w2 and w3 are preassigned weights. Generating the texture data can include a two-pass process, the mixed noise data and synthesized texture data can be processed using a first technique in a first pass, and in a second pass a portion of the texture data from the first pass can be replaced with mixed noise data and synthesized texture data processed using a second technique. Generating the texture data can include a two-pass process, the synthesized texture data can be processed using a first technique in a first pass, and in a second pass a portion of the texture data from the first pass can be replaced with noise data processed using a second technique. The synthesized texture data can include an indication of an algorithm used to re-generate a noise value.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein:

FIG. 8 illustrates block diagram of an image encoder system according to at least one example implementation.

FIG. 9 illustrates block diagram of an image decoder system according to at least one example implementation.

Figure 1:
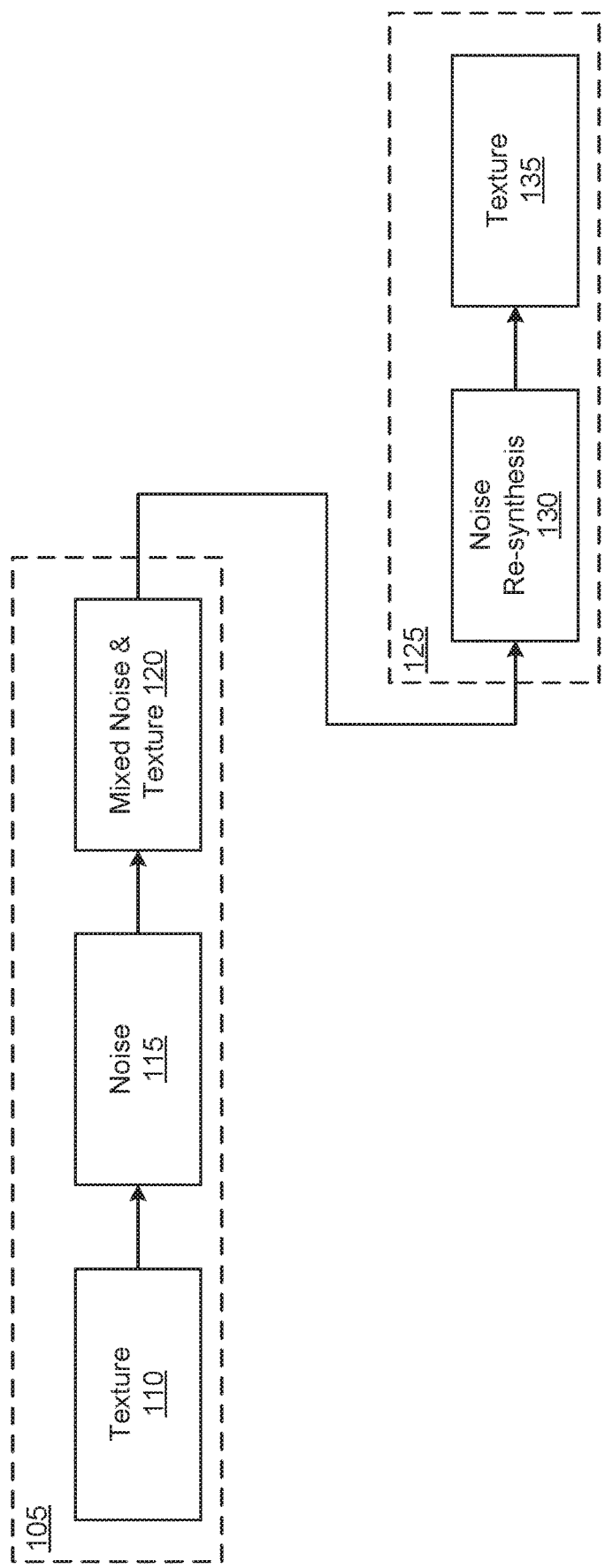
FIG. 1 illustrates a block diagram of data flow according to an example implementation.

It should be noted that these Figures are intended to illustrate the general characteristics of methods, structure and/or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementations. For example, the positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE IMPLEMENTATIONS

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

In a noise removal technique, the spatial spectral characteristics of the noise can be modeled by a windowed Fast Fourier Transform (FFT). The highest frequency noise can be clustered (e.g., bucketed, organized, and the like) into radially symmetric clusters (e.g., buckets) that contain directional features. For example, the noise can be clustered using four directions: up-left, up, up-right, right. The opposite directions are redundant for a texture direction. Spatial patterns then can be defined that synthesize the noise for these directions. The total noise can be calculated as, for example, total noise=w0*noise-up-left+w1*noise-up+w2*noise-up-right+w3*noise-right. In example implementations, zero or positive values for the weights (w0, w1, w2 and w3) can be chosen or assigned.

Furthermore, the noise can be re-synthesized from the directionally biased multiple noise sources. When the noise sources are added together, the noise sources create non-directional noise. In addition, the noise patterns can be optimized so that for any weighting, a goal statistic can satisfy some constraint. Example constraints can include a noise pattern that does not have a bright (or dark) spot in the same place so as to avoid a bright (or dark) spot that gets amplified by every weight. Furthermore, constraints can be added so that specific clusters or visual features do not occur, to prevent local clusters from emerging. Furthermore, the total level of noise can be constrained to correlate to the intensity level.

Typically, in digital photography, photons detected by the camera's sensors are gamma compressed. This can change the properties of the noise in a way that at low intensities the sensor noise gets numerically higher values. In example implementations, the image compression system can model this correlation. This allows controlling the noise synthesis using a much lower spatial frequency control field, and locally modulating the noise synthesis through intensity. Because the noise synthesis has lower spatial frequencies, less information is stored (e.g., it is stored with larger pixels). Having larger pixels allows use of vectors (instead of scalars) to describe the noise, which allows for specifying directionality and other texture-like features of the noise without using significantly more memory to store a compressed image.

FIG. 1 illustrates a block diagram of data flow according to an example implementation. As shown in FIG. 1, a texture block 110 includes data associated with texture of an image (e.g., filtered noise, a texture layer of an image, a texture map for the image and/or the like) or texture data. In a noise block 115, the texture data and/or a portion of the texture data is converted to noise data and/or an algorithm representing noise. Then, in a mixed noise and texture block 120, data representing some noise (and/or an algorithm representing noise) and texture is generated. In an example implementation, the mixed noise and texture block 120 can cluster noise into radially symmetric clusters that use vectors to describe the noise.

The texture block 110, the noise block 115 and the mixed noise and texture block 120 can be included in and/or be implemented in an encoder 105. The output of the mixed noise and texture block 120 can be stored with encoded data representing a color portion or color layer of the image.

The output of the mixed noise and texture block 120 (e.g., as read from a data storage device) can be used as input to a noise re-synthesis block 130. The noise re-synthesis block 130 can generate noise data from mixed noise and synthesized data. The re-synthesis block 130 can use a weighted algorithm with the vectors used to describe noise as an input. The weighted algorithm can generate non-directional noise. Then, in a texture block 135, the texture data (e.g., a texture layer of an image, a texture map for the image and/or the like) for the image can be regenerated from the noise data. The noise re-synthesis block 130 and the texture block 135 can be included in and/or be implemented in a decoder 125.

Figure 2:
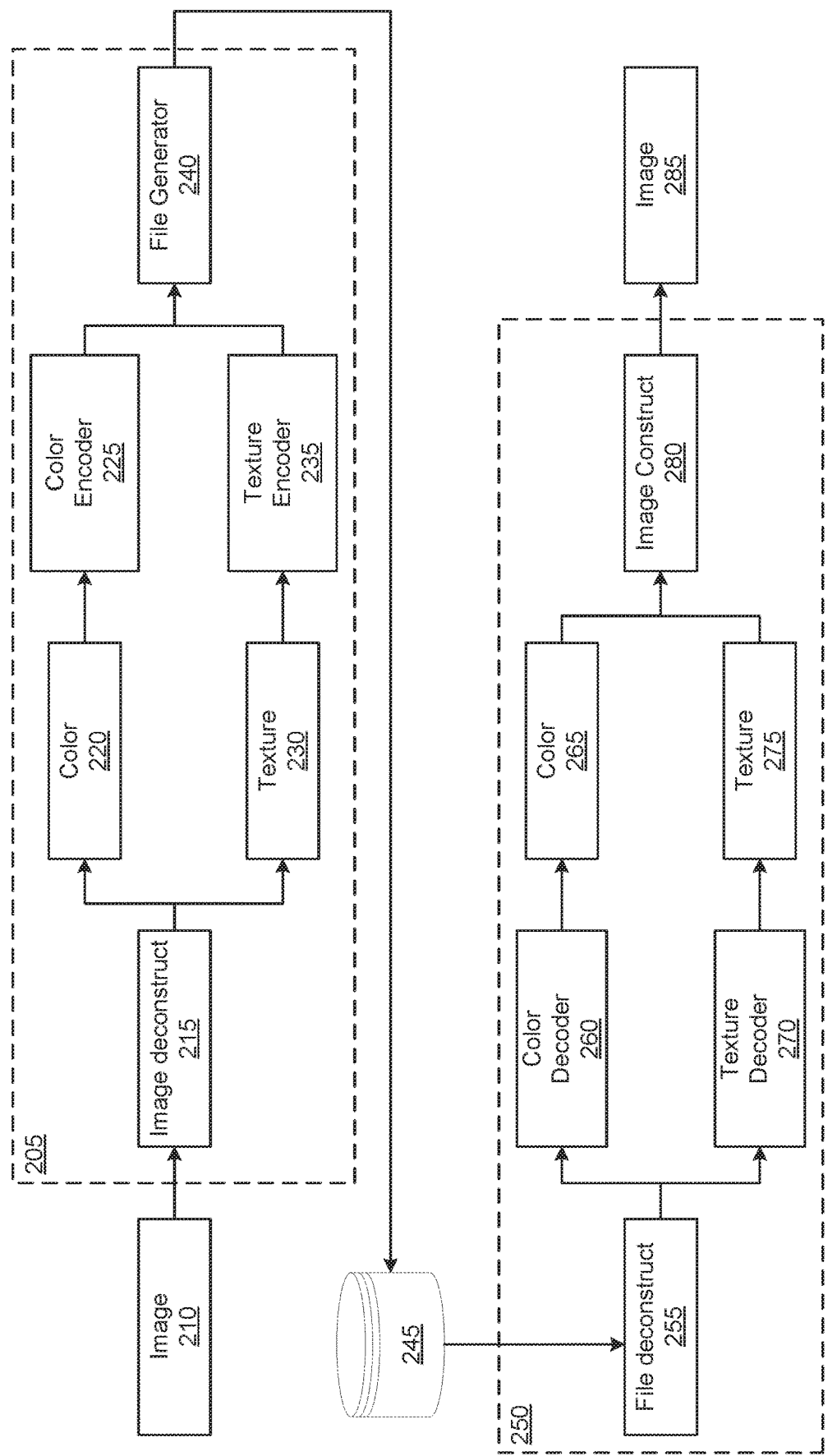
FIG. 2 illustrates a block diagram of an encoder/decoder system data flow according to an example implementation.

FIG. 2 illustrates a block diagram of an encoder/decoder system data flow according to an example implementation. As shown in FIG. 2. The encoder/decoder system includes an encoder 205, a data storage 245 and a decoder 250. The encoder 205 includes an image deconstruct block 215, a color encoder block 225, a texture encoder block 235 and a file generator block 240.

The image deconstruct block 215 is configured to separate image 210 into color data 220 and texture data 230. Color data 220 can be typical pixel color data associated with the image 210. The color encoder block 225 can be configured to compress the color data 220 using a compression standard (e.g., JPEG, GIF, BMP, PNG, and the like). Texture can be seen as pixel color or intensity variations as compared to surrounding pixels. However, noise (e.g., noise from camera sensors) can have the same characteristics as texture (e.g., seen as pixel color or intensity variations). Therefore, the image deconstruct block 215 can separate the texture data as if the texture is noise. In addition, the noise (e.g., the noise representing texture and other noise) is kept as texture data 230 rather than discarded (as noise typically would be). Accordingly, texture data 230 can include texture data, noise data and/or both.

Furthermore, typical noise reduction techniques remove noise (e.g., as a scalar value) without considering directional or spatial details (because the noise data is going to be discarded). However, in example implementations, directional and spatial information associated with each noise data point (e.g., the noise associated with each pixel) is kept.

In an example implementation, the image deconstruct block 215 can filter noise from the image 210. In an implementation where only the resultant filtered image would exist, the resultant filtered image can be subtracted from image 210 to calculate the noise. This noise can be the texture data 230 in the data flow. The resultant filtered image can be the color data 220 in the data flow.

In another example, the image 210 can include a plurality of layers. One of the layers can be, for example, a texture layer added using an image editing tool. The image deconstruct block 215 can separate the texture layer from the color layer. The texture layer can be a texture map.

The texture encoder 235 can use texture data 230 as input data. The texture data 230 can be data points calculated as noise representing texture and/or texture data points (e.g., a texture map) read as noise or converted to noise. Furthermore, in the texture encoder 235, a windowed FFT can be applied to the noise (e.g., scalar values corresponding to the noise) to generate (e.g., model) the spatial spectral characteristics of the noise.

High frequency noise (e.g., transformed noise within the range of the window, transformed noise above a threshold value, transformed noise meeting a condition, and/or the like) can be clustered into radially symmetric clusters, which each cluster being assigned one or more identical value for a parameter characterizing the noise. For example, each cluster can be assigned a same direction value (e.g., up, down, left, right) and/or each cluster can be assigned a same scalar value. In other words, each data point of the transformed noise will be a vector (having a scalar value and a direction), and data points having values within a range can be assigned an identical value (e.g., clustered, bucketed, quantized and the like). In addition, each cluster can be assigned an algorithm configured to regenerate the vector representing the noise associated with the cluster. As described in more detail below, texture transitions can be accounted for in the texture encoder block 235.

Figure 3:
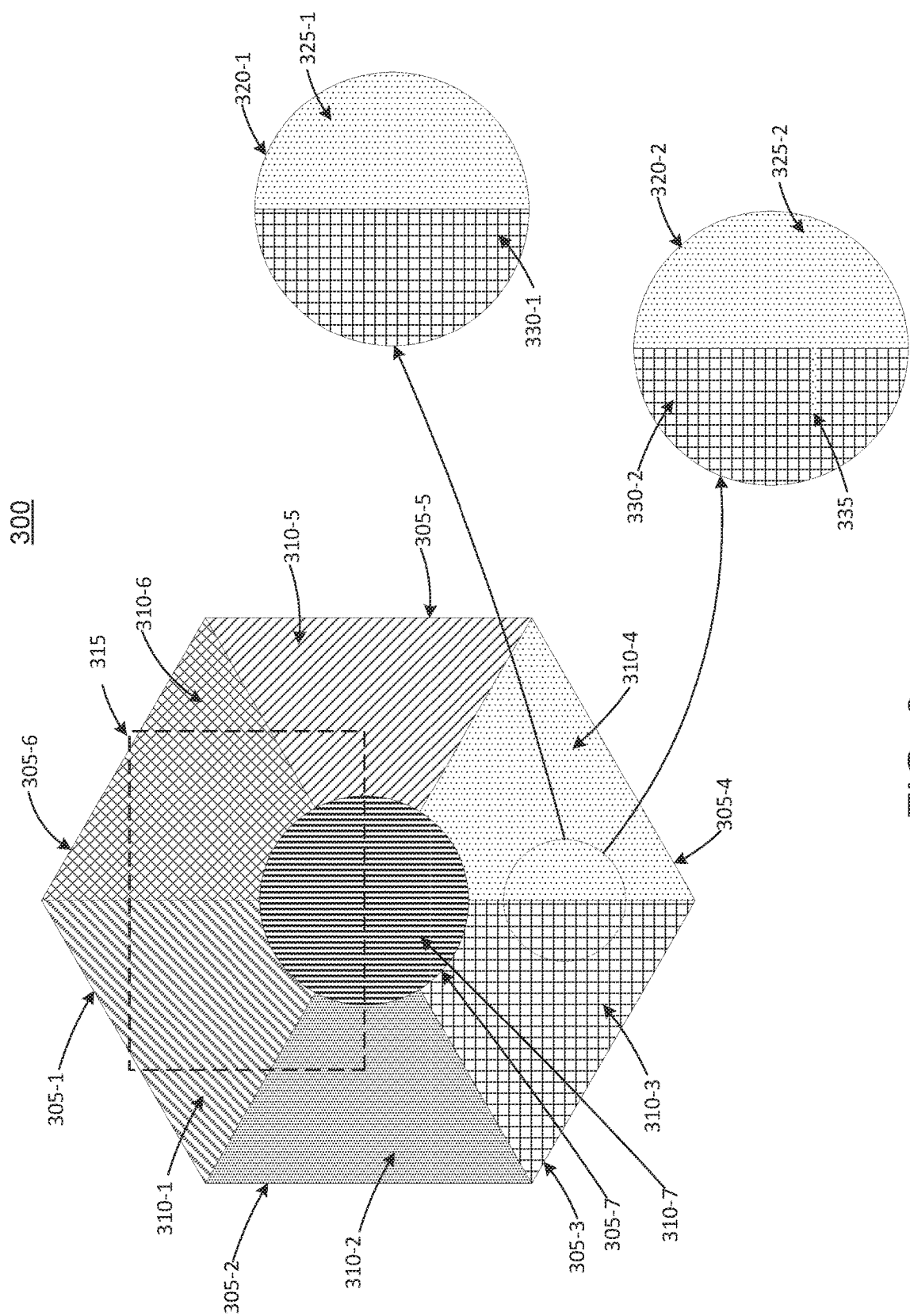
FIG. 3 illustrates a portion of an image with different texture regions.

FIG. 3 illustrates a portion of an image 300. The image 300 includes a plurality of texture regions 305-1, 305-2, 305-3, 305-4, 305-6, 305-7 each having a texture 310-1, 310-2, 310-3, 310-4, 310-6, 310-7. The texture 310-1, 310-2, 310-3, 310-4, 310-6, 310-7 can be represented as noise. Portion 320-1, 320-2 is a blow-up of a portion of texture region 305-3 and a portion of texture region 305-4. Texture region 305-3 and texture region 305-4 (and similar regions) can be referenced as adjacent texture regions. Typically, adjacent texture regions can have different textures (e.g., texture 325-1 can be different than texture 330-1). The different textures can be represented by different noise. The different noise can have different vector values or value ranges. For example, the direction (up, down, left, right) of the noise associated with texture region 305-3 can be different than the direction of texture region 305-4.

Portion 320-1 can be viewed as including an original and desired reconstructed adjacent textures 325-1 and 330-1. Portion 320-2 can be viewed as including undesired reconstructed adjacent textures 325-2 and 330-2. For example, portion 320-2 includes anomaly texture 335. The anomaly texture 325 can occur during reconstruction of the image 300 due to summing noise vectors. For example, the noise vectors along a border between adjacent textures 325-2 and 330-2 could include vectors with enough direction vectors in one direction (e.g., left) such that the vectors add to generate the anomaly texture 335. Example implementations can prevent the generation of the anomaly texture 335.

Figure 4:
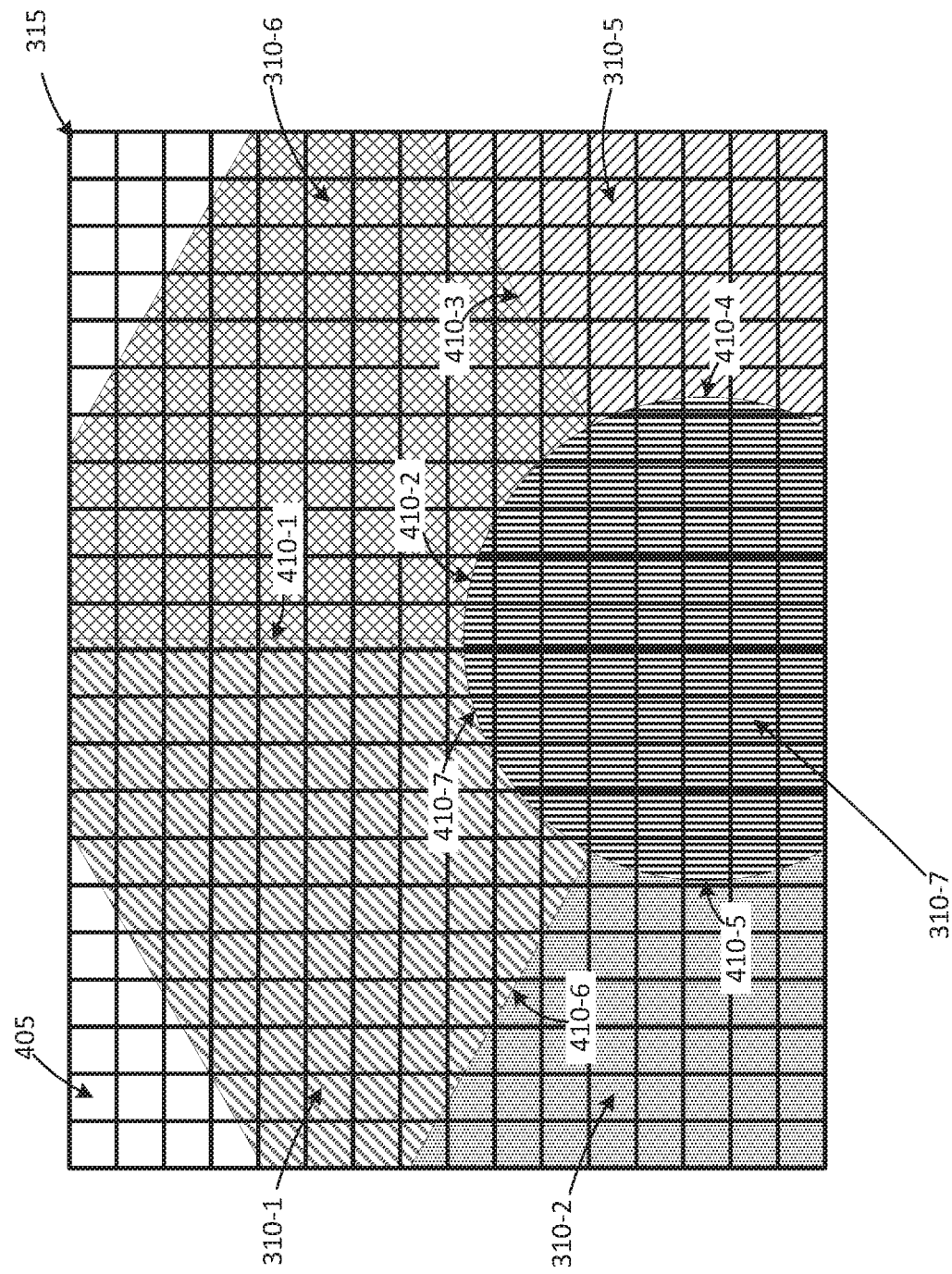
FIG. 4 illustrates a portion of the image illustrated in FIG. 3 with a block grid overlaid on the portion of the image.

FIG. 4 illustrates a portion 315 of the image 300 with a block grid 405 overlaid on the portion 315. As shown in FIG. 4, each texture region 305-1, 305-2, 305-3, 305-4, 305-6, 305-7 having a texture 310-1, 310-2, 310-3, 310-4, 310-6, 310-7 also have a border 410-1, 410-2, 410-3, 410-4, 410-6, 410-7 between adjacent textures. Each block of the block grid 405 can represent a position of a pixel or group of pixels. Some blocks of the block grid 405 can include one texture. Some blocks of the block grid 405 can include more than one texture. As shown, the blocks of the block grid 405 that include more than one texture can be along one or more of the borders 410-1, 410-2, 410-3, 410-4, 410-6, 410-7.

In an example implementation each data point (e.g., representing texture of a pixel) in each block of the block grid 405 the texture can be represented by noise, a noise vector, an algorithm configured to generate noise, an algorithm configured to generate a noise vector and/or the like.

For example, a noise vector can be generated using a windowed Fast Fourier Transform (FFT). The highest frequency noise can be clustered (bucketed, organized, and the like) into radially symmetric clusters (e.g., buckets) that contain directional features as described above.

Alternately, or in addition to, the blocks of the block grid 405 that include more than one texture can be left as a texture or noise representing the texture. Alternately, or in addition to, the blocks of the block grid 405 that are close to a border (with or without considering a number of textures included in the block) can be left as a texture or noise representing the texture. Alternately, or in addition to, the blocks of the block grid 405 can be assigned a value indicating an algorithm that can be used to re-generate a noise value. In some implementations, multiple techniques are used. For example, a data point-by-data point decision can be used to determine how to process the data. In another example, a two-pass process can be used where the data is processed using one technique in a first pass and in a second pass some of the data from the first pass is replaced with data processed using a second technique. The end result can be mixed noise and texture data Returning to FIG. 2, file generator 240 can be configured to generate a file including the color encoder 225 output (e.g., a compressed image) and the texture encoder 235 output (e.g., mixed noise & synthesized texture data). The file generator 240 can generate a single file or multiple associated files. The file can be a data set that can be communicated (e.g., a message, a packet and the like) or stored. The file can be stored in data storage 245.

As shown in FIG. 2, the decoder 250 includes a file deconstruct block 255, a color decoder 260, a color block 265, a texture decoder 270, a texture block 275 and an image construct block 280. The file deconstruct block 255 can be configured to read a file from the data storage 245. The file can include data representing a compressed image and associated texture and/or noise data. The file deconstruct block 255 can be further configured to separate the compressed image from the texture and/or noise data. The compressed image is input to the color decoder 260. The color decoder 260 can be configured to decompress (e.g., decode, reconstruct, and the like) the compressed image using a compression standard (e.g., JPEG, GIF, BMP, PNG, and the like). The decompressed image is shown as color block 265.

The texture and/or noise data is input to the texture decoder 270. The texture decoder 270 can be configured to generate texture 275 data for each pixel in the color block 265 based on the texture and/or noise data. The texture 275 data can be added to the color 265 data in the image construct block 280 to generate image 285. Image 285 is a reconstructed representation of image 210 including texture originally included in image 210.

The texture decoder 270 can be configured to re-synthesize noise from directionally biased multiple noise sources. When the noise sources are added together, the noise sources create non-directional noise. In addition, the noise patterns can be optimized so that for any weighting, a goal statistic can satisfy some constraint. Example constraints can include that every noise pattern should not have a bright (or dark) spot in the same place so that the bright (or dark) spot gets amplified by every weight. Furthermore, constraints can include a requirement that specific clusters or visual features should not occur, so local clusters can be prevented from emerging and a constraint that he total level of noise should correlate to the intensity level.

The texture decoder 270 can be further configured to build texture data that can be added to color data in order to reconstruct an image (e.g., image 210) that had textured features before being compressed. In an example implementation, the texture can be regenerated or resynthesized as noise. For example, the reconstructed image (e.g., image 285) does not have to have the same texture characteristics on each pixel as the original image (e.g., image 210). In other words, the texture can be noise (e.g., random intensity or color variations) associated with each pixel in the original image (e.g., image 210). Therefore, noise that closely resembles the noise of the original image can be added to the reconstructed image (e.g., image 285).

For example, fine high frequency textures such as hair, cloth, tree leaves, waves on a lake, and/or the like can be represented as noise. The directionality of the high frequency textures can be modeled and reconstructed without visual artefacts (e.g., visual inconsistencies like anomaly texture 335) in a reconstructed image. In other words, reconstructed tree leaves in an image can have a visually consistent texture without an adjacent background (e.g., sky or grass) having tree leaf textures run into the texture of the adjacent background.

Accordingly, the texture decoder 270 can generate the texture data using algorithms, transmitted texture data, transmitted noise data, noise, noise vectors and the like. In some implementations noise vector data can be added together using a weighted algorithm (as discussed above) to generate non-directional (scalar) noise. In some implementations an algorithm can be selected based on an indication associated with a block of data, a cluster of data, bucketed data and/or the like. Noise or texture data can be the same data as the original image data along a border (e.g., border 410-1, 410-2, and the like) between adjacent textures. In some implementations an inverse-FFT of noise data can be performed after the texture data.

Figure 5:
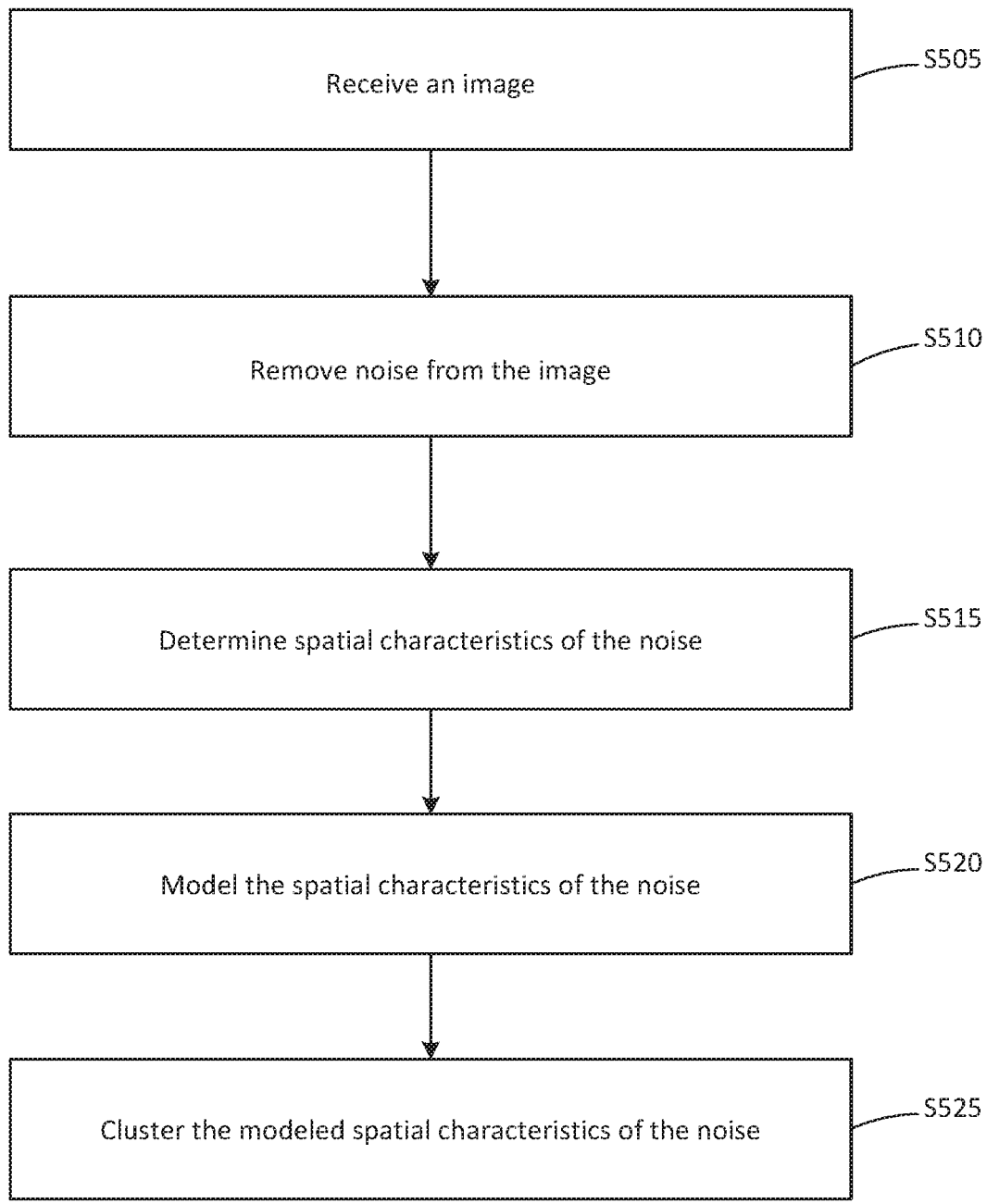
FIG. 5 illustrates a method for synthesizing noise and texture associated with an image according to at least one example implementation.
Figure 6:
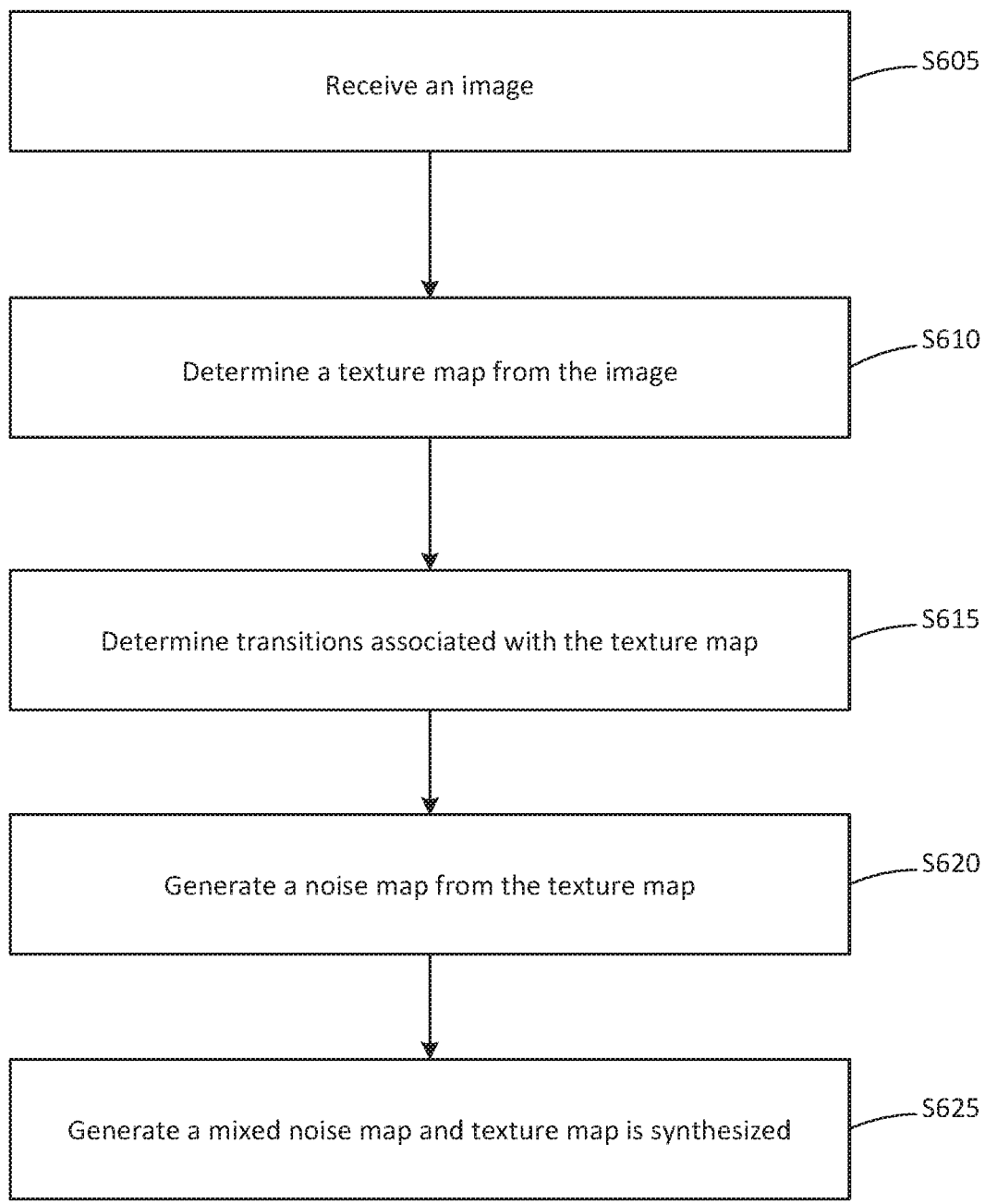
FIG. 6 illustrates another method for synthesizing noise and texture associated with an image according to at least one example implementation.
Figure 7:
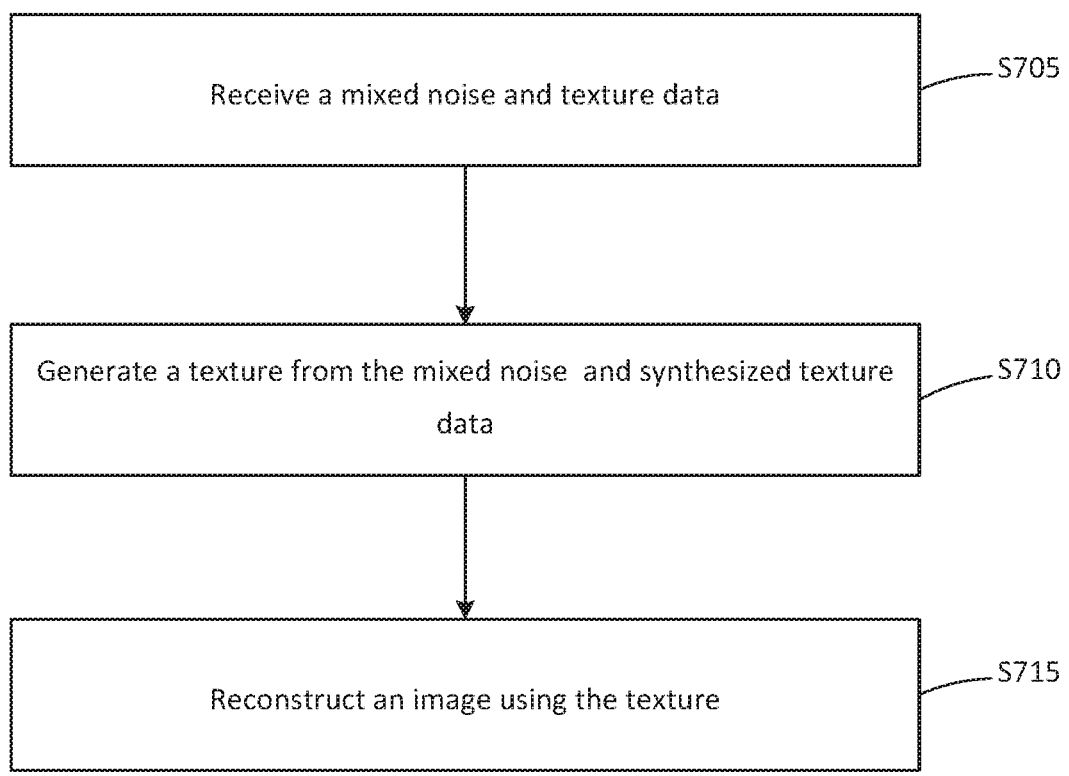
FIG. 7 illustrates a method for reconstructing an image using synthesized noise and texture according to at least one example implementation.
Figure 10:
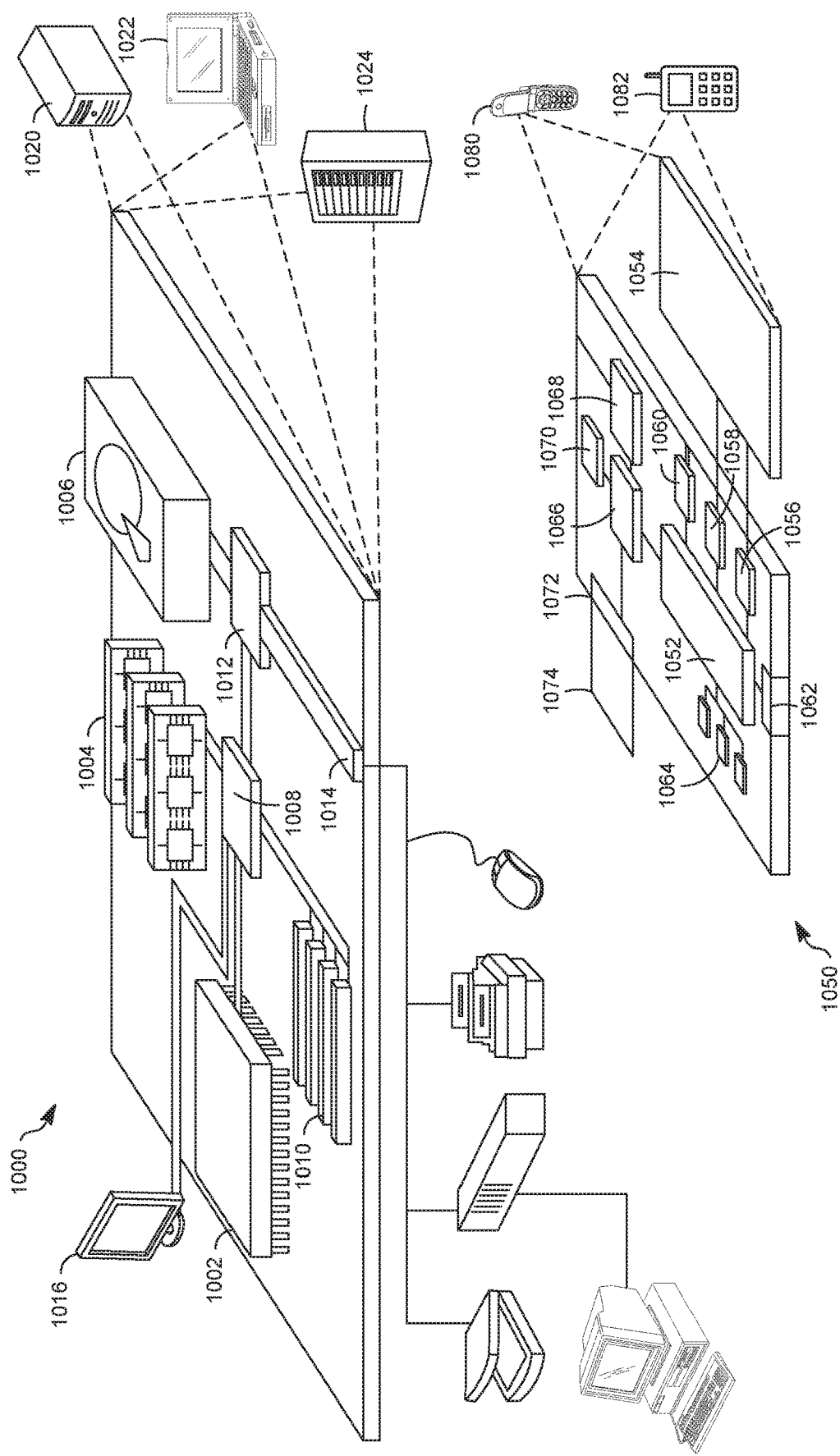
FIG. 10 shows an example of a computer device and a mobile computer device according to at least one example implementation.

FIGS. 5-7 are flowcharts of methods according to example implementations. The steps described with regard to FIGS. 5-7 may be performed due to the execution of software code stored in a memory (e.g., at least one memory 810, 910) associated with an apparatus (e.g., as shown in FIGS. 8, 9 and 10 (described below)) and executed by at least one processor (e.g., at least one processor 805, 905) associated with the apparatus. However, alternative implementations are contemplated such as a system embodied as a special purpose processor. Although the steps described below are described as being executed by a processor, the steps are not necessarily executed by a same processor. In other words, at least one processor may execute the steps described below with regard to FIGS. 5-7.

FIG. 5 illustrates a method for synthesizing mixed noise and texture associated with an image according to at least one example implementation. As shown in FIG. 5, in step S505 an image is received. For example, the image can be image data captured by a camera, the image can be computer generated image data, the image can be image data captured by a camera that is subsequently modified using a computer executed program configured to manipulate (e.g., filter) the image data, and/or the like. The image can be stored remotely received at a device implementing this method. The device implementing this method can be a camera or coupled to a camera such that this method is implemented subsequent (e.g., directly after) capturing the image.

In step S510 noise is removed from the image. For example, typical noise reduction techniques remove noise (e.g., as a scalar value) without considering directional or spatial details (e.g., because the noise data is going to be discarded). However, in example implementations directional and/or spatial information associated with each noise data point (e.g., the noise associated with each pixel) is kept. This can be a single operation or in an implementation where the noise is filtered out of the image and only the resultant filtered image would exist, the resultant filtered image can be subtracted from the image to calculate the noise.

In step S515 spatial characteristics of the noise is determined. For example, pixel color (e.g., RGB, YUV and the like) values sharpness, tone scale, luminance, graininess and/or intensity can be determined. In step S520 the spatial characteristics of the noise is modeled. The spatial characteristics of an image can be described by signal and noise power distributions (e.g., of the color and/or intensity) for the image. Often the spatial characteristics of devices can be mid-tone. However, fine high frequency textures such as hair, cloth, tree leaves, waves on a lake, and/or the like can be represented as noise as well. Therefore, in example implementations the high frequency noise representing spatial characteristics can be modeled. For example, the noises' spatial spectral characteristics can be modeled by a windowed Fast Fourier Transform (FFT).

In step S525 the modeled spatial characteristics of the noise is clustered. For example, the highest frequency noise can be clustered (bucketed, organized, and the like) into radially symmetric clusters (e.g., buckets) that contain directional features. For example, using four directions: up-left, up, up-right, right and the like. In an example implementation, spatial patterns can then be defined that create the noise for these directions. The spatial patterns can represent objects (e.g., hair, cloth, tree leaves, waves on a lake, and/or the like) in the image. The spatial patterns can be associated with a position in the image. The spatial patterns can be algorithms or mathematical formulas that can be used to recreate the spatial characteristics and/or the noise. The spatial patterns can be stored in association with individual pixels and/or in association with group of pixels. The stored spatial patterns can be referred to as synthesized noise and texture associated with an image.

FIG. 6 illustrates another method for synthesizing mixed noise and texture associated with an image according to at least one example implementation. As shown in FIG. 6, in step S605 an image is received. For example, the image can be image data captured by a camera, the image can be computer generated image data, the image can be image data captured by a camera that is subsequently modified using a computer executed program configured to manipulate (e.g., filter) the image data, and/or the like. The image can be stored remotely received at a device implementing this method. The device implementing this method can be a camera or coupled to a camera such that this method is implemented subsequent (e.g., directly after) capturing the image.

In step S610 a texture map is determined from the image. For example, the image 210 can include a plurality of layers. One of the layers can be, for example, a texture layer added using an image editing tool. The texture layer can be separated from other layers (e.g., a color layer) of the image. The texture layer can be a texture map.

In step S615 transitions associated with the texture map are determined. For example, transitions between texture regions can be determined. Referring to FIG. 4, a texture region 305-1 to 305-7 can have a texture 310-1 to 310-7 and a border 410-1 to 410-7 between adjacent textures. The transitions between texture regions can be at the border 410-1 to 410-7 between adjacent textures.

In step S620 a noise map is generated from the texture map. For example, as discussed above, texture can be represented as noise. Therefore, some ratio (e.g., 1:1, 1:2, 2:1) can be used to convert texture values to noise values.

In step S625 a mixed noise map and texture map is synthesized (or generated). For example, a texture region 305-1 to 305-7 can be assigned a noise value or noise value range based on the noise values. Furthermore, portions of the texture region 305-1 to 305-7 close to the transitions associated with the texture map can be left as or assigned the original texture value.

Combinations and variations of the methods described with regard to FIG. 6 and FIG. 7 are within the scope of this disclosure. For example, step S510 can be replaced with steps S610 and S620. Alternatively, step S620 can be replaced by steps S510-S525 and the noise in step S625 can be the spatial characteristics of the noise.

FIG. 7 illustrates a method for reconstructing an image using synthesized mixed noise and texture according to at least one example implementation. As shown in FIG. 7, in step S705 a mixed noise and texture is received. For example, the synthesized mixed noise and texture is can be the mixed noise and texture synthesized or generated in FIGS. 6, 7 and/or combinations and variations thereof. The mixed noise and texture can be received from a data storage coupled to a device implementing the method of FIG. 7.

In step S710 a texture data and/or a texture map is generated from the mixed noise and texture. For example, the noise can be re-synthesized from the directionally biased multiple noise sources. When the noise sources are added together, the noise sources create non-directional noise. In addition, the noise patterns can be optimized so that for any weighting, a goal statistic can satisfy some constraint. Example constraints can be that every noise pattern should not have a bright (or dark) spot in the same place so that the bright (or dark) spot gets amplified by every weight. In an example implementation, the noise can be calculated as:

total=w0*noise-up-left+w1*noise-up+w2*noise-up-right+w3*noise-right. In example implementations, zero or positive values for the weights (w0, w1, w2 and w3) can be chosen or assigned.

In step S715 an image is reconstructed using the texture data and/or texture map. For example, the texture data can be added to color data in the image construct to generate an image. Alternatively (or in addition) the texture map can be added as a layer to an image. The image is a reconstructed representation of a previously encoded image (e.g., image 210) including texture originally included in the previously encoded image.

FIG. 8 illustrates block diagram of an image encoder system according to at least one example implementation. As shown in FIG. 8, the image encoder system 800 includes the at least one processor 805, at least one memory 810, an encoder 820, a texture module 825, a noise module 830, a synthesis module 835 and a standard encoding module 840. The at least one processor 805 and the at least one memory 810 are communicatively coupled via bus 815.

The at least one processor 805 may be utilized to execute instructions stored on the at least one memory 810, so as to thereby implement the various features and functions described herein, or additional or alternative features and functions. The at least one processor 805 and the at least one memory 810 may be utilized for various other purposes. In particular, the at least one memory 810 can represent an example of various types of memory and related hardware and software which might be used to implement any one of the modules described herein.

The at least one memory 810 may be configured to store data and/or information associated with the image encoder system 800. For example, the at least one memory 810 may be configured to store codecs associated with encoding images. The at least one memory 810 may be a shared resource. The encoder 820 can be configured to compress an image using a compression standard (e.g., JPEG, GIF, BMP, PNG, and the like). Therefore, the encoder 820 includes the standard encoding module 840 which is configured to encode (e.g., compress) an image (e.g., color data, RGB, YUV and the like) using an image compression codec as defined by the compression standard.

The encoder 820 can be further configured to generate (or synthesize) texture and noise data and/or a mixture of texture and noise data. The texture and noise data is then associated with the encoded (e.g., compressed) image. Therefore, the encoder 820 includes the texture module 825, the noise module 830 and the synthesis module 835. The texture module 825 can be configured determine, remove, filter and the like data associated with texture of an image (e.g., filtered noise, a texture layer of an image, a texture map for the image and/or the like). This data or texture data can be stored in the texture module 825, in association with the texture module 825 and/or in the at least one memory 810. The noise module 830 can be configured determine, remove, filter and the like data associated with noise of an image (e.g., filtered noise or the like). This data or noise data can be stored in the noise module 830, in association with the noise module 830 and/or in the at least one memory 810.

As discussed above, in example implementations noise (e.g., noise from camera sensors) can have the same characteristics as texture (e.g., seen as pixel color or intensity variations). Therefore, the texture data can be used as if the texture is noise (e.g., converted to noise, treated as noise, and/or the like). The synthesis module 835 can be configured to generate (e.g., model) the spatial spectral characteristics of the noise, combine (e.g., combine in a file) noise data, texture data, the spatial spectral characteristics of the noise and/or representations thereof. Generating and synthesizing these types of data are described in more detail above.

FIG. 9 illustrates block diagram of an image decoder system according to at least one example implementation. As shown in FIG. 9, the image encoder system 900 includes the at least one processor 905, at least one memory 910, a decoder 920, a resynthesis module 925, a standard decoding module 930 and an image generator module 935. The at least one processor 905 and the at least one memory 910 are communicatively coupled via bus 915.

The at least one processor 905 may be utilized to execute instructions stored on the at least one memory 910, so as to thereby implement the various features and functions described herein, or additional or alternative features and functions. The at least one processor 905 and the at least one memory 910 may be utilized for various other purposes. In particular, the at least one memory 910 can represent an example of various types of memory and related hardware and software which might be used to implement any one of the modules described herein.

The at least one memory 910 may be configured to store data and/or information associated with the image encoder system 900. For example, the at least one memory 910 may be configured to store codecs associated with encoding images. The at least one memory 910 may be a shared resource. The decoder 920 can be configured to decompress an image using a compression standard (e.g., JPEG, GIF, BMP, PNG, and the like). Therefore, the decoder 920 includes the standard decoding module 930 which is configured to decode (e.g., decompress) a compressed image (e.g., color data, RGB, YUV and the like) using an image decompression codec as defined by the compression standard.

The decoder 920 can be further configured to reconstruct an image using mixed (or synthesized) noise and texture data. Therefore, the decoder 920 includes the re-synthesis module 925 and the image generator module 935. The re-synthesis module 925 can be configured to generate texture (e.g., as noise, a texture map and/or the like) from the mixed noise and synthesized texture data. The image generator module 935 can be configured to add (e.g., pixel-by-pixel, as an image layer and/or the like) the texture to a decoded image.

As discussed above, a relatively large amount of memory is used to store some representation of noise within an image. The representations of noise that are available can be primitive in image formats, even though the noise itself can be a large amount of information. Encoding this noise can be computer resource expensive (e.g., use a significant amount of memory, use a significant amount of processing cycles, increase processing time, use a significant amount of communication bandwidth, and the like) which is undesirable. Further, removing the noise can also cause the removal some fine textures (e.g., that are desirable to keep in the image). Accordingly, the above described system and method improves computer technology by reducing computer resources while encoding and decoding an image. Further, the above described system and method improves computer technology by retaining fine textures in images without excessive utilization of computer and communication resources.

FIG. 10 shows an example of a computer device 1000 and a mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that includes data that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. An encoder comprising:
a texture module configured to determine texture data associated with texture of an image; and
at least one module configured to:
determine noise data based on the texture data,
generate spatial spectral characteristics of the noise data,
cluster a portion of the noise data into radially symmetric clusters that use vectors to describe a noise power distribution based on the spatial spectral characteristics of the noise data, and
generate a representation of texture in the image by combining at least two of the noise data, the texture data, and the spatial spectral characteristics of the noise data based on at least one border between adjacent textures of portions of the image.

2. The encoder of claim 1, wherein
the texture module separates the image into texture data and color data, the texture data being at least one of a pixel color variation as compared to surrounding pixels and a pixel intensity variation as compared to surrounding pixels, and
the encoder is configured to compress the color data.

3. The encoder of claim 1, wherein the texture data is noise that is filtered from the image.

4. The encoder of claim 1, wherein
the image includes a plurality of layers, and
the texture data is included in one of the plurality of layers.

5. The encoder of claim 1, wherein
the noise data is calculated as noise representing texture, and
a windowed FFT is applied to the noise data to generate the spatial spectral characteristics of the noise.

6. The encoder of claim 1, wherein the at least one module is configured to:
determine high frequency noise as noise data above a threshold value,
cluster the high frequency noise meeting a condition into radially symmetric clusters, and
assign each cluster at least one of a scalar value and a direction value.

7. The encoder of claim 1, wherein the noise data is at least one of noise, a noise vector, an algorithm configured to generate noise, and an algorithm configured to generate a noise vector.

8. A method comprising:
receiving an image;
determining spatial spectral characteristics of noise in the image;
modeling the spatial spectral characteristics of the noise in the image as a noise power distribution;
clustering a portion of the modeled spatial spectral characteristics of the noise into radially symmetric clusters that use vectors to describe the noise power distribution; and
generating a file to represent texture in the image, the file including the noise in the image and the radially symmetric clusters based on at least one border between adjacent textures of portions of the image.

9. The method of claim 8, further comprising applying a windowed FFT to the noise in the image to generate the spatial spectral characteristics of the noise.

10. The method of claim 8, further comprising defining spatial patterns based on the radially symmetric clusters, wherein the spatial patterns represent objects associated with the image.

11. The method of claim 8, further comprising removing the noise by filtering at least one of a pixel color variation as compared to surrounding pixels and a pixel intensity variation as compared to surrounding pixels from the image.

12. A decoder comprising:
a re-synthesis module configured to:
receive mixed noise data and synthesized texture data associated with a compressed image, the mixed noise data and synthesized texture data including noise data and synthesized texture data corresponding to pixel data that is structured based on at least one border between adjacent portions of the compressed image having different textures, and
generate texture data from the mixed noise data and synthesized texture data;
a decoder module configured to decompress the compressed image using an image decompression codec; and
an image generator module configured to generate an image by adding the generated texture data to the decompressed image.

13. The decoder of claim 12, wherein the image generator module adds the texture data to the decompressed image pixel-by-pixel.

14. The decoder of claim 12, wherein the image generator module adds the texture data to the decompressed image as an image layer.

15. The decoder of claim 12, wherein the image does not have texture characteristics on each pixel that are the same as an original image.

16. The decoder of claim 12, wherein
the noise is clustered into radially symmetric clusters,
each cluster is assigned at least one of a scalar value and a direction value, and
the noise is calculated using a weighted algorithm where each scalar value is weighted.

17. The decoder of claim 12, wherein
the noise is clustered into four radially symmetric clusters,
each cluster is assigned a scalar value and a direction value, and
the noise for each pixel is calculated as:

$$\text{total} = w0 * \text{noise-up-left} + w1 * \text{noise-up} + w2 * \text{noise-up-right} + w3 * \text{noise-right},$$

where
w0, w1, w2 and w3 are preassigned weights.

18. The decoder of claim 12, wherein
generating the texture data includes a two-pass process,
the mixed noise data and synthesized texture data is processed using a first technique in a first pass, and
in a second pass a portion of the texture data from the first pass is replaced with mixed noise data and synthesized texture data processed using a second technique.

19. The decoder of claim 12, wherein
generating the texture data includes a two-pass process,
the synthesized texture data is processed using a first technique in a first pass, and
in a second pass a portion of the texture data from the first pass is replaced with noise data processed using a second technique.

20. The decoder of claim 12, wherein the synthesized texture data includes an indication of an algorithm used to re-generate a noise value.

* * * * *